Oct. 5, 1926.
F. LÖSEL
1,602,199
STEAM POWER PLANT
Filed April 21, 1924
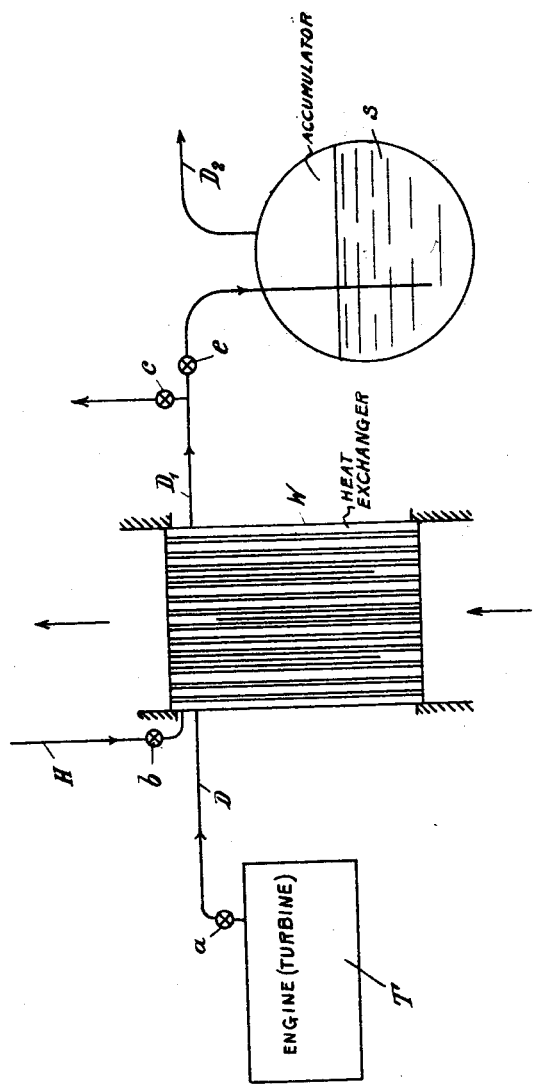

Patented Oct. 5, 1926.

1,602,199

UNITED STATES PATENT OFFICE.

FRANZ LÖSEL, OF BRUNN, CZECHOSLOVAKIA.

STEAM-POWER PLANT.

Application filed April 21, 1924, Serial No. 708,082, and in Austria April 14, 1923.

This invention refers to steam power plants and more particularly to plants including engines such as steam turbines and to the utilization therein of the energy of steam to as great an extent as possible.

The waste heat of steam power plants more particularly the waste heat of the smoke or flue gases were heretofore utilized in economizers for heating the feed water or preheating the combustion air, and the flue gases were also utilized for superheating steam. Similarly the heat of the exhaust steam of steam engines and steam turbines is utilized either for heating purposes or by collecting it in heat accumulators which then supply heating water or low pressure steam. The two sources of waste heat are thus utilized independently of each other in similar ways.

I have found that in many cases it is more advantageous to utilize the waste heat of the smoke or flue gases for improving the condition of extraction steam or waste steam in combination with heat accumulators. Accordingly my invention consists in reconditioning the extraction or exhaust steam of steam engines including also steam turbines in a surface heat exchange apparatus heated by waste heat, connecting the heat exchange apparatus with a heat accumulator and in then supplying the steam required for further steam consumption apparatus either from the heat exchange apparatus or from the heat accumulator or from both. Preferably the surface heat exchange apparatus is provided with means for injecting water and is adapted for additional steam generation.

In modern steam turbine plants the extraction or exhaust steam from the last or low pressure turbines has a comparatively high pressure, but is very wet; this steam requires only some heating up for permitting it to be utilized in engines. It has already been proposed to heat up a part of such extraction or exhaust steam and to do so in the usual known reheater or superheater of the boiler plant and therefore this heating up involves a reduction of the normal production of steam in the boilers. According to my invention, however, the reconditioning of the extraction or exhaust steam is brought about by the waste heat of the smoke or fuel gases and combining or connecting the heat exchange apparatus with heat accumulators, with the result that I obtain by my invention a highly efficient low pressure steam meeting clearly and economically the required conditions and demands and taking care of the irregularities in the condition and quantity of the exhaust or extraction steam required.

According to a preferred form of the invention, provision is made of a steam power plant including an engine, preferably a turbine, a surface heat exchange apparatus heated by waste heat, a heat accumulator, a pipe line connecting said engine with said heat exchange apparatus to lead exhaust or extraction steam from said engine to said heat exchange apparatus, a means, including a second pipe line, to lead steam from said heat exchange apparatus for further use, a third or branch connection pipe line leading to said heat accumulator and a fourth pipe line leading steam from said heat accumulator for further use, to render said accumulator capable of use in series with the third and fourth pipe lines and in parallel with the second pipe lines.

The annexed drawing illustrates diagrammatically by way of example an embodiment of my invention.

In the drawing T indicates a steam turbine, W a surface heat exchange apparatus heated by smoke or flue gases, waste gases or the like and S' a heat accumulator of any known or preferred construction. Preferably an economizer specially provided for this purpose or a part of the economizer system of the boiler plant itself is used as the heat exchange apparatus. The saturated steam coming from any part of the steam engine plant, which term is to be understood to include also steam turbine plants, through a pipe D is heated in the heat exchange apparatus W by waste heat and is thereby converted into superheated steam which either flows through the pipe $D_1$ and a control valve $c$ directly to consumption apparatus or through a control valve $e$ to a heat accumulator S from which it may be supplied as accumulator steam through the pipe $D_2$ to any apparatus where it may be utilized. Of course the heated up steam may flow through the valves $c$ and $e$ simultaneously, or steam taken from the accumulator S through the valves $c$ and $e$ may be added to the steam coming from the heat exchange apparatus. $a$ is a controlling valve on the turbine which in some cases for instance in case of back pressure turbines may be dispensed with.

H is a water injection pipe for the heat exchange apparatus W, and b is a controlling or shutting off device provided in the same for instance a temperature controlling device. The object of the injection of water is to control the condition at which the steam enters the heat exchange apparatus and if required the condition at which the steam escapes from such apparatus. Under certain conditions the injection of water may also result in generating additional steam.

One of the advantages secured by the invention is that on the one hand in the engine more particularly an extraction or back pressure turbine the energy of the extraction, back pressure or exhaust steam may be utilized under more favorable conditions to the lowest possible temperature and that on the other hand the steam consumption apparatus receives steam of the condition desired. The latter advantage is obtained almost without any expenses by using the waste heat of the plant for heating the heat exchange apparatus and also connecting same with a heat accumulator or thermal storage. By this invention the efficiency of the turbine and of the entire plant is increased and the economy of the plant is improved.

What I claim is:

1. In a steam power plant, the combination of an engine, a surface heat exchange apparatus heated by waste heat, a heat accumulator, a pipe line connecting said engine with said heat exchange apparatus to lead exhaust or extraction steam from said engine to said heat exchange apparatus, means, including a second pipe line to lead steam from said heat exchange apparatus for further use, a third or branch connection pipe line leading steam from said heat exchange apparatus to said heat accumulator and a fourth pipe line to lead steam from said accumulator for further use, to render said accumulator capable of use in series with the third and fourth pipe lines and in parallel with the second pipe line.

2. In a steam power plant, the combination of a turbine, a surface heat exchange apparatus heated by waste heat, means for injecting water into said heat exchange apparatus, a heat accumulator, a pipe line to lead steam from the turbine to the surface heat exchange apparatus, a pipe line to lead steam from said heat exchange apparatus for further use, and a branch connection pipe line leading to said heat accumulator.

3. In a steam power plant, the combination of an engine, a pipe line through which exhaust or extraction steam from said engine passes to steam consumption apparatus, a heat accumulator connected with said pipe line and having an outlet through which steam may be withdrawn, valve means for controlling the flow of the steam to said steam consumption apparatus and said heat accumulator, and means, located in said pipe line intermediate said engine and the connection of said heat accumulator with said pipe line, for reconditioning the steam from the engine as required by the use to be made thereof.

4. In a steam power plant, the combination of an engine, means for reconditioning extraction or exhaust steam from said engine and including a surface heat exchange apparatus heated by waste heat and means for injecting water into said extraction or exhaust steam at the entrance of said heat exchange apparatus, a pipe line to lead the reconditioned steam from said heat exchange apparatus for use in steam consumption apparatus, a heat accumulator connected with said pipe line at an intermediate point, and means to control the passage of the reconditioned steam to the steam consumption apparatus or to the heat accumulator without interference with the working of the engine.

5. In a steam power plant, the combination of an engine, a pipe line through which exhaust or extraction steam from said engine passes to steam consumption apparatus, a heat accumulator connected with said pipe line, valve means for controlling the flow of the steam to said steam consumption apparatus and said heat accumulator, and means, located in said pipe line intermediate said engine and the heat accumulator connection, for reconditioning the steam both qualitatively and quantitatively in accordance with the flow of steam to said steam consumption apparatus or said heat accumulator.

6. In a steam power plant, the combination of an engine, a pipe line through which exhaust or extraction steam from said engine passes to steam consumption apparatus, a heat accumulator connected with said pipe line, valve means for controlling the flow of the steam to said steam consumption apparatus and said heat accumulator, and means, located in said pipe line intermediate said engine and the heat accumulator connection, for reconditioning the steam both qualitatively and quantitatively in accordance with the flow of steam to said steam consumption apparatus or said heat accumulator, and comprising heat exchange apparatus heated by flue gases and water injection means to act on the steam at the entrance of said heat exchange apparatus.

In testimony whereof I affix my signature.

FRANZ LÖSEL.